United States Patent Office 3,433,824
Patented Mar. 18, 1969

3,433,824
PROCESS FOR MAKING GLYCOL ESTERS
Lee H. Horsley, Midland, Mich., assignor to The Dow Chemical Company, Midland, Mich., a corporation of Delaware
No Drawing. Filed July 19, 1965, Ser. No. 473,210
U.S. Cl. 260—476       10 Claims
Int. Cl. C07c 67/00, 69/78, 69/54

ABSTRACT OF THE DISCLOSURE 2-hydroxyalkyl esters of carboxylic acids are made by reacting the carboxylic acid with at least three molar equivalents of alkylene oxide at a temperature below 125° C. and in the presence of a catalytic amount of the sodium or lithium salt of the acid.

---

This invention relates to the production of β-hydroxyalkyl esters of carboxylic acids by the reaction of vicinal alkylene oxides with such acids:

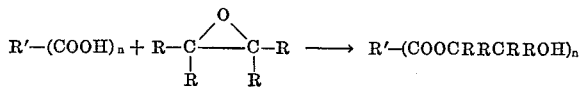

$$R'-(COOH)_n + R-C\overset{O}{\underset{R}{-}}C-R \longrightarrow R'-(COOCRRCRROH)_n$$
$$\phantom{R'-(COOH)_n + R-}\underset{R}{|}\ \underset{R}{|}$$

wherein R' and each R is H or an inert organic radical and $n$ is an integer at least 1. In the above reaction as practiced heretofore, two undesired side-reactions occurred:

(1) A second mole of acid or ester reacted with the hydroxyl group of the desired product, thus producing the diester of the alkylene glycol, and (2) Additional alkylene oxide reacted with the desired product, thus producing polyoxyalkylene esters.

Heretofore, attempts have been made to minimize the second side-reaction by using less than the stoichiometric amount of alkylene oxide (i.e., by use of excess acid). In many cases this poses a separation problem because the acid and the desired ester often boil near the same temperature.

It has now been discovered that alkylene glycol monoesters (β-hydroxyalkyl esters) are produced in high yield and conversion, and of high purity in that very little glycol diester or polyoxyalkylene ester is present, by the reaction of a carboxylic acid with an alkylene oxide under carefully controlled conditions:

(1) The catalyst must be the sodium or lithium salt of the acid to be esterified. Whereas the prior art has considered these catalysts to be merely the equivalent of the potassium, cesium, calcium, barium or amine salts, these latter catalysts are not equivalent to Na or Li salts in the present invention.

(2) The mole ratio of alkylene oxide to carboxylic acid should be at least three times, and preferably at least four times, the stoichiometric ratio.

(3) The reaction temperature should not exceed about 125° C. and is preferably not more than 100° C.

(4) The reaction should be stopped when substantially all of the acid has been esterified.

Operation outside the above critical limits leads to the formation of increasing amounts of glycol diesters and polyoxyalkylene esters. It is to be understood, of course, that the above critical factors are interrelated and that good results can be obtained even when one variable is unfavorable, provided that the others are optimized. Thus, the Li salt is a more selective catalyst than the Na salt; the selectivities of the common lower alkylene oxides vary widely in the inverse order of molecular weight, i.e., $C_4 > C_3 > C_2$; the reaction is more selective at low temperatures than at higher ones and at high oxide/acid ratios than at lower ones. By "selectivity" is meant the favoring of the desired reaction and minimizing of the undesired ones.

The amount of catalyst can be varied widely. In general, large amounts, such as 0.1 mole per mole of acid, cause rapid reaction but show somewhat less selectivity than do smaller amounts. Suitable ratios are about 0.01 to 0.1 mole per mole of acid, the preferred ratio being about 0.02 to 0.06 mole per mole.

The practice of the invention is illustrated by the following examples.

In a series of experiments, the reactants were sealed in a glass ampoule, heated during the reaction period, cooled, removed from the ampoules and analyzed by vapor phase chromatography. In each experiment 0.01 mole (0.60 g.) of acetic acid, 0.0004 mole of alkali metal acetate and indicated amount of alkylene oxide were reacted under a nitrogen atmosphere.

Results of some typical experiments are shown in Table 1.

The table shows the mole percent (oxide-free basis) of acetic acid, glycol monoacetate (mono), glycol diacetate (di) and polyglycol esters (polys) in the product. The polys consist essentially (ca. 90%) of diglycol monoester.

TABLE 1

| Example No. | Oxide [1] | Mole ratio oxide/acid | Catalyst | Temp., °C. | Time, hrs. | Products, mole percent | | | |
|---|---|---|---|---|---|---|---|---|---|
| | | | | | | HOAc | Mono | Di | Polys |
| 1 | PO | 6/1 | NaOAc | 80 | 16 | 0 | 95.3 | .5 | 4.2 |
| 2 | BO | 6/1 | NaOAc | 80 | 16 | 0 | 96.6 | 0 | 3.4 |
| 3 | PO | 6/1 | NaOAc | 100 | 16 | 0 | 94.6 | 0.8 | 4.6 |
| 4 | PO | 6/1 | NaOAc | 125 | 16 | 0 | 63.2 | 25.2 | 11.6 |
| 5 | BO | 6/1 | NaOAc | 125 | 16 | 0 | 93.2 | 3.4 | 3.4 |
| 6 | EO | 4/1 | LiOAC | 100 | 16 | 0.5 | 52.8 | 31.4 | 15.8 |
| 7 | BO | 4/1 | LiOAc | 100 | 16 | 0.9 | 93.2 | 0.6 | 6.2 |
| 8 | PO | 4/1 | NaOAc | 100 | 8 | 0.6 | 92.9 | 0.8 | 6.3 |
| 9 | PO | 4/1 | NaOAc | 125 | 8 | 0 | 61.1 | 19.8 | 19.1 |
| 10 | PO | 4/1 | LiOAc | 125 | 8 | 0.2 | 84.4 | 8.5 | 7.1 |
| 11 | EO | 8/1 | LiOAc | 100 | 16 | 0.3 | 92.5 | 1.7 | 5.8 |
| 12 | PO | 4/1 | NaOAc | 100 | 16 | 0 | 88.7 | 5.8 | 5.5 |
| 13 | PO | 4/1 | LiOAc | 100 | 22 | 0 | 90.7 | 0.9 | 8.4 |
| 14 | PO | 4/1 | NaOAc | 100 | 22 | 0 | 52.2 | 15.6 | 32.2 |
| 15 | PO | 4/1 | KOAc | 100 | 22 | 0 | 0 | Polyesters | |
| 16 | BO | 3/1 | LiOAc | 100 | 4 | 5.3 | 93.7 | 0.6 | 5.7 |

[1] EO, PO and BO are, respectively, ethylene, 1,2-propylene and 1,2-butylene oxides.

Results generally similar to those shown in Table 1 are obtained when instead of acetic acid there is used other fatty acids, such as butyric, caproic, capric, lauric, myristic, palmitic, stearic, acrylic, methacrylic, crotonic, undecylenic, oleic, linoleic, linolenic, eleostearic acid or the like; aliphatic polycarboxylic acids, such as succinic, adipic, azelaic, sebacic, maleic, fumaric, itaconic, citric and tricarballylic acids; aromatic mono- and polycarboxylic acids, such as benzoic, alkylbenzoic, phthalic, isophthalic, hemimellitic, naphthoic and diphenic acids and the like, and in general, substantially any carboxylic acid.

The Na or Li salt catalyst may be added as such to the reaction mixture or it may be formed in situ by the reaction of the acid with the alkali metal hydroxide, carbonate or the like.

I claim:

1. The process of making a β-hydroxyalkyl ester of a carboxylic acid comprising reacting by contacting the carboxylic acid with at least three molar equivalents of a vicinal lower alkylene oxide at a temperature not exceeding 125° C. and in the presence of a catalytic amount of the Na or Li salt of the acid.

2. The process of claim 1 wherein the catalyst is a lithium salt.

3. The process of claim 1 wherein the temperature does not exceed 100° C.

4. The process of claim 1 wherein the acid is a fatty acid.

5. The process of claim 1 wherein the acid is a fatty acid of up to 18 carbon atoms or succinic, adipic, azelaic, sebacic, maleic, fumaric, itaconic, citric, tricarballylic, benzoic, alkylbenzoic, phthalic, isophthalic, hemimellitic, naphthoic or diphenic acid.

6. The process of claim 5 wherein the alkylene oxide is propylene oxide.

7. The process of making β-hydroxypropyl acetate comprising reacting by contacting acetic acid with at least three molar equivalents of propylene oxide at a temperature of not more than 125° C. and in the presence of a catalytic amount of lithium acetate.

8. The process of claim 5 wherein the acid is acrylic acid.

9. The process of claim 5 wherein the acid is methacrylic acid.

10. The process of claim 5 wherein the acid is benzoic acid.

References Cited

UNITED STATES PATENTS 2,929,835    3/1960    Hayes et al. _____ 260—486

JAMES A. PATTEN, *Primary Examiner.*

EDWARD GLEIMAN, *Assistant Examiner.*

U.S. Cl. X.R.

260—410.6, 469, 475, 484, 485, 486, 488